Nov. 24, 1953     M. P. WINTHER ET AL     2,660,071
TRANSMISSION CONTROL SYSTEM
Filed Sept. 13, 1951     6 Sheets-Sheet 1
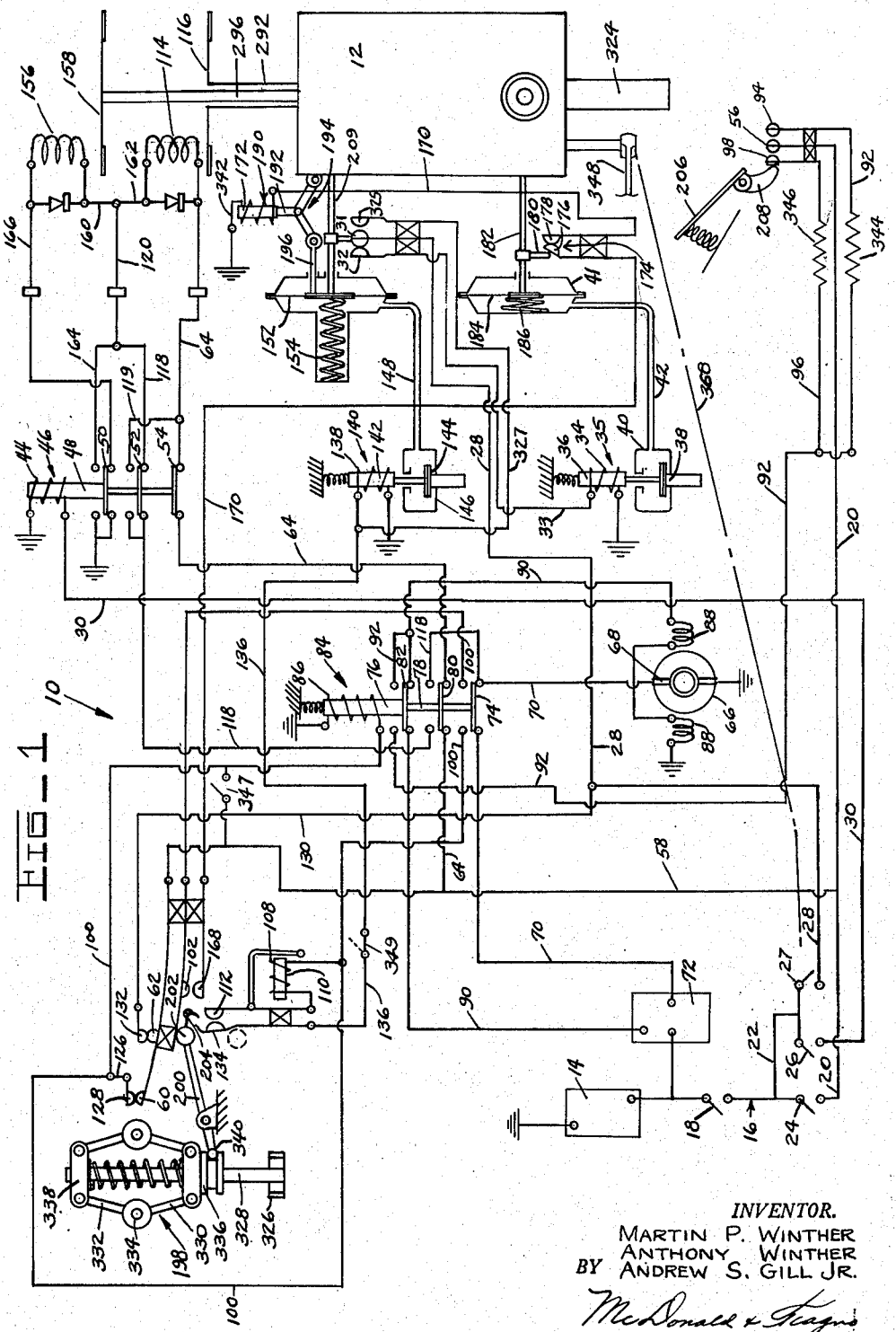
*INVENTOR.*
MARTIN P. WINTHER
ANTHONY WINTHER
BY ANDREW S. GILL JR.
ATTORNEYS

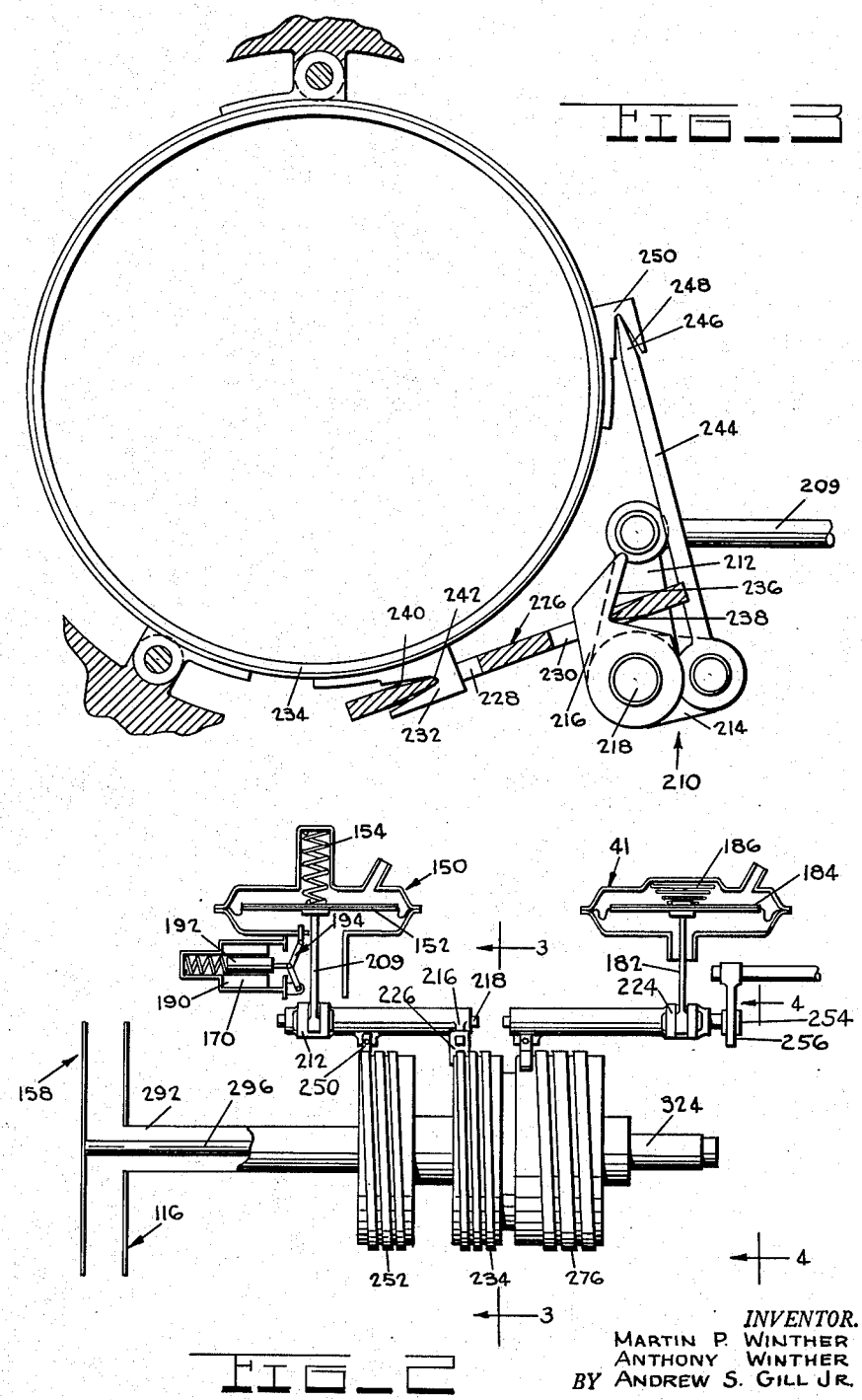

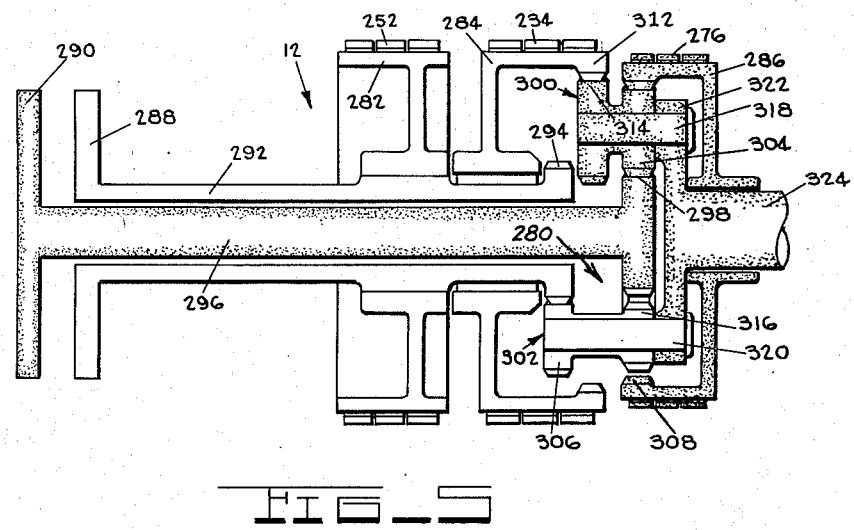
FIG_3
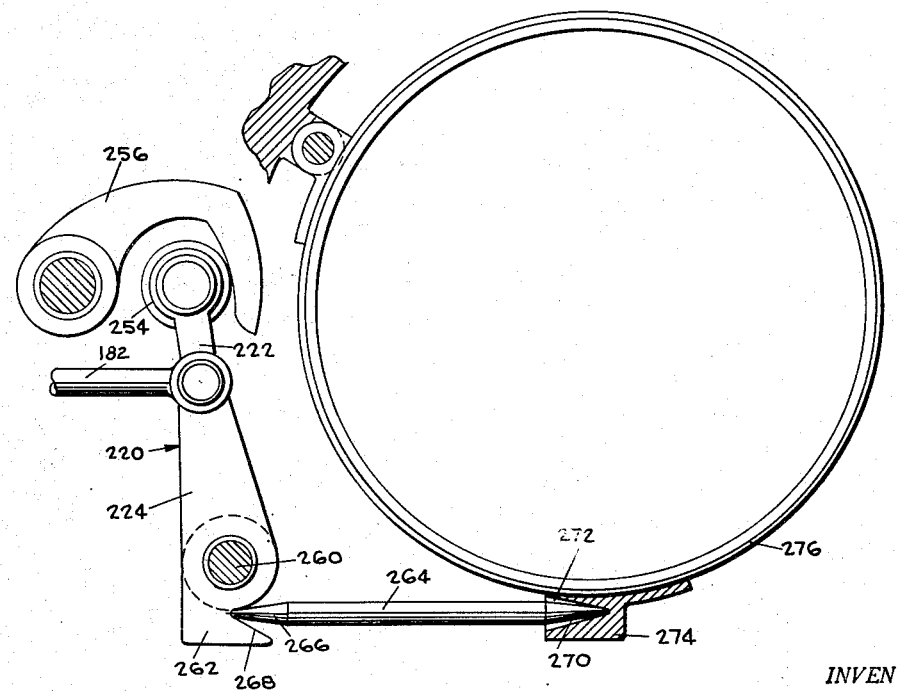
FIG_4
INVENTOR.
MARTIN P. WINTHER
ANTHONY WINTHER
ANDREW S. GILL JR.
BY
ATTORNEYS

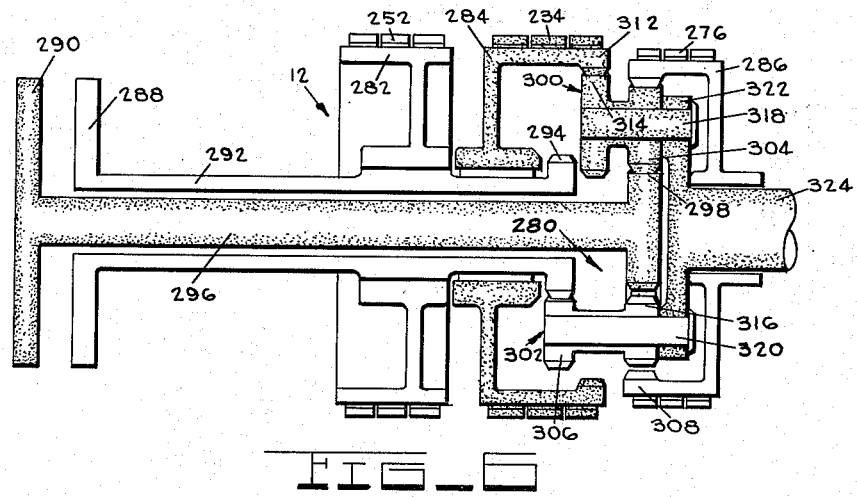
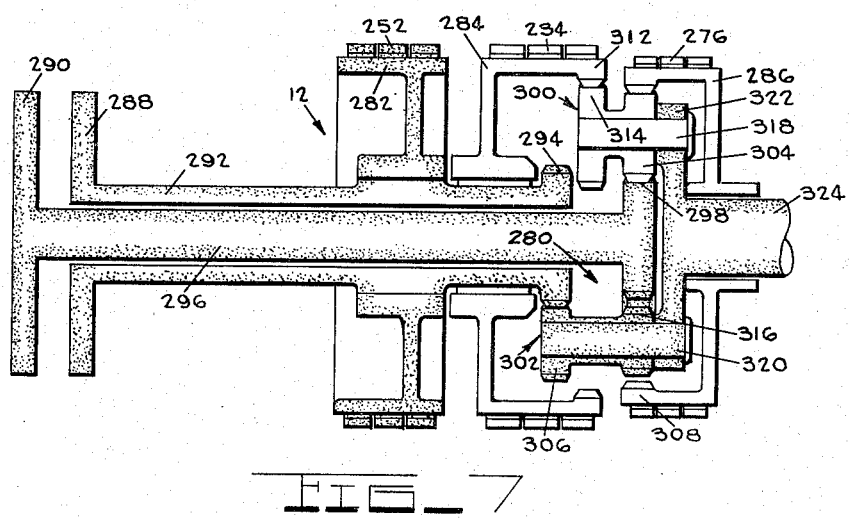

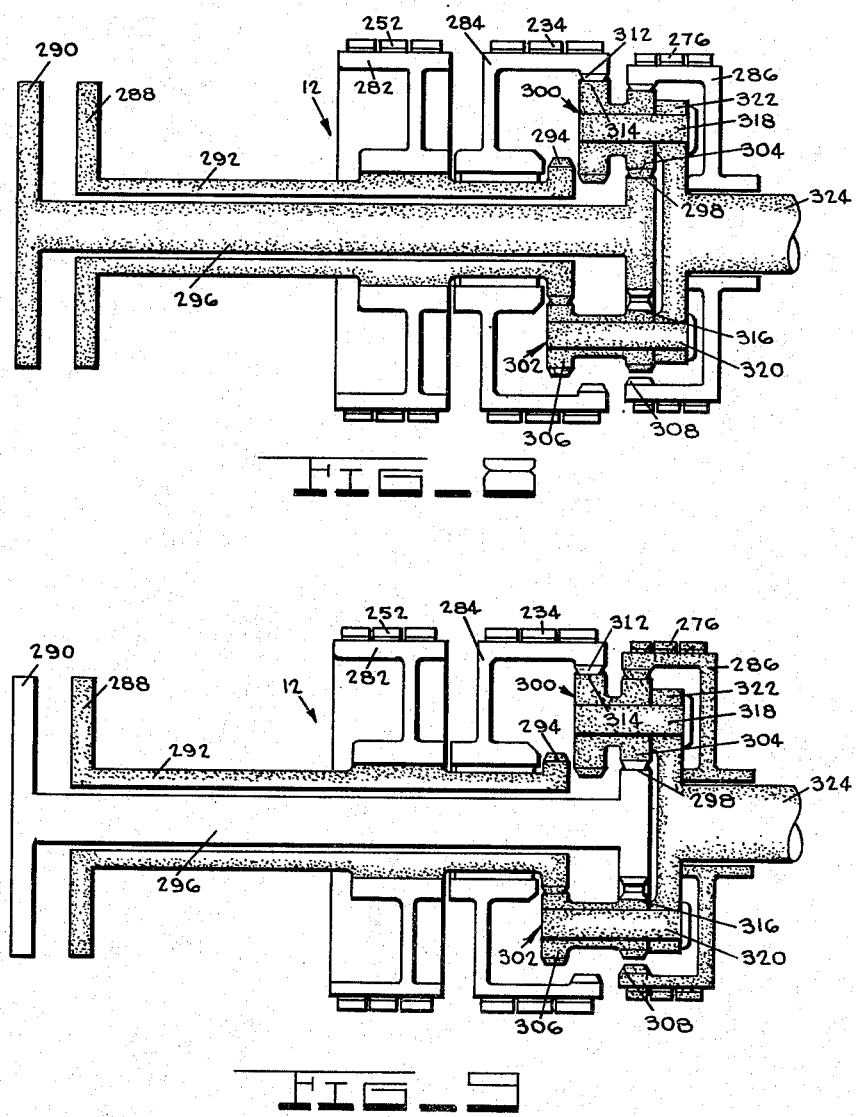

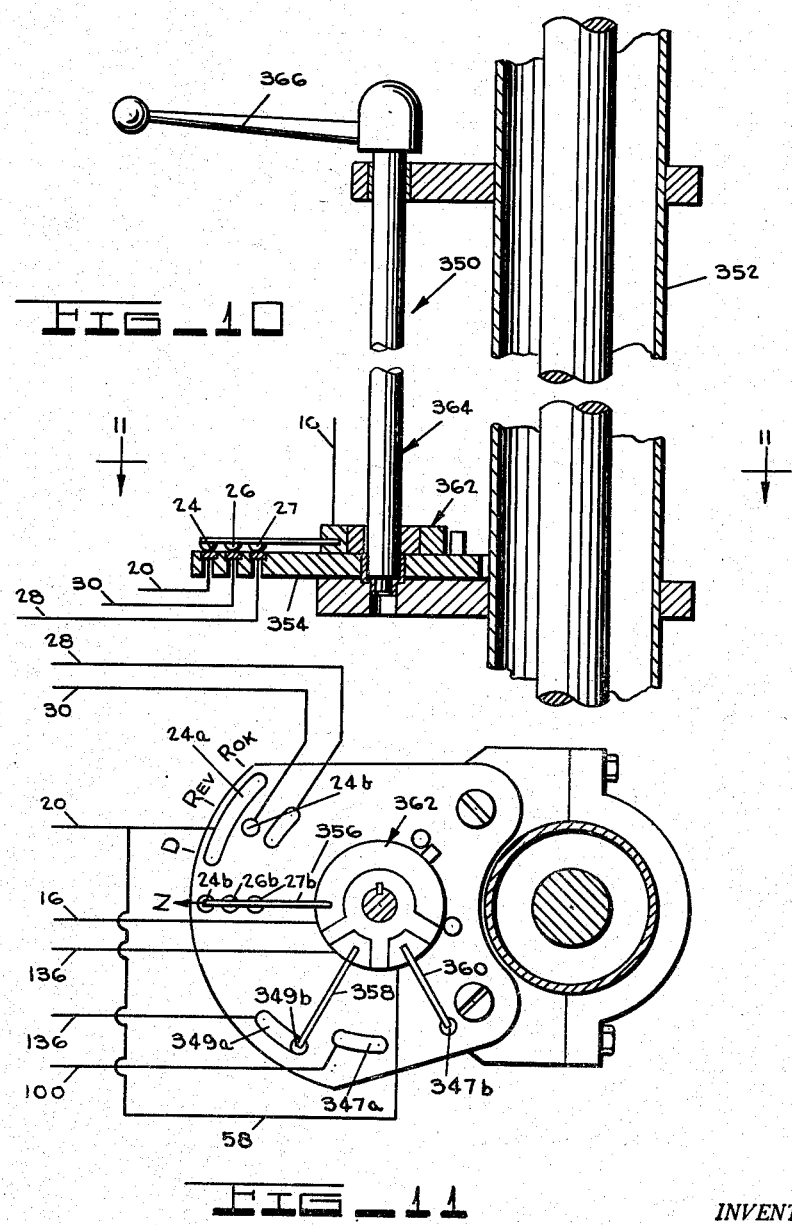

Patented Nov. 24, 1953

2,660,071

UNITED STATES PATENT OFFICE 2,660,071

TRANSMISSION CONTROL SYSTEM

Martin P. Winther, Gates Mills, Ohio, Anthony Winther, Kenosha, Wis., and Andrew S. Gill, Jr., Maple Heights, Ohio, assignors, by direct and mesne assignments, to Eaton Manufacturing Company, Cleveland, Ohio, a corporation of Ohio Application September 13, 1951, Serial No. 246,496

17 Claims. (Cl. 74—472)

This invention relates to transmissions and more particularly to a control system therefor and constitutes a continuation-in-part of application Serial No. 195,379 filed November 13, 1950.

Broadly the invention comprehends the provision of a governor operated control system for a four speed forward and one speed reverse planetary transmission for vehicles and the like wherein the control system includes an electrical network under the control of the governor for the operative control of the change speed mechanisms of the transmission.

Among the principal objects of the invention are the following:

To provide a planetary gear transmission control system that is quick, smooth and effective in operation; that is adaptable to control a transmission as applied to a vehicle; that is automatically controlled by a speed responsive governor; that is electrical power supplied; that controls the operation of a pair of clutches and a compound planetary gear system; that affords for the control of four forward speeds and one reverse speed of operation; and that will provide for the rocking operation of a vehicle in the controlling of the vehicle's transmission with which it is incorporated.

Other objects and advantages of the invention will appear from the following description taken in connection with the drawings forming a part of the specification, and in which:

Fig. 1 is a schematic layout of a control system for a planetary gear transmission;

Fig. 2 is a partly cross-sectionalized partly elevation view of the vacuum cylinders and the brake bands for the transmission operated by the cylinders;

Fig. 3 is a front plan view of two of the brake bands for the transmission taken substantially along lines 3—3 of Fig. 2;

Fig. 4 is a front plan view of the other brake band for the transmission taken substantially along lines 4—4 of Fig. 2;

Figs. 5-9 are schematic layouts of a planetary gear transmission in succeeding stages of four forward speeds of operation and one reverse speed of operation as controlled by the system of Fig. 1;

Fig. 10 is a fragmentary, cross-sectionalized view of a switch control mechanism as arranged upon a steering post of a vehicle in which the transmission of Figs. 5-9 is incorporated; and Fig. 11 is a cross-sectional view taken substantially along lines 11—11 of Fig. 10.

Similar reference characters indicate corresponding parts throughout the several views of the drawings.

This transmission control system was devised primarily as a means for effectively, automatically controlling the operation of the four speed forward, one speed reverse planetary gear transmission devised by Martin P. Winther and upon which application Serial No. 195,379 was filed on November 13, 1950. The transmission to be controlled includes basically a pair of electromagnetic clutches and a compound planetary gear system controlled by three brake bands.

The system is basically electrical in its arrangement and is dependent for its operation for the forward speed of operation of the transmission by a speed responsive governor. Included in the electrical network of the system are a plurality of interconnected electrical circuits operative in accordance with the speed of the vehicle to which the transmission is applied, whereby as the governor so responds to such speed the circuits are alternately opened or closed as the case may be to provide for the desired combination of gear and clutch operation.

The brake bands for the intermeshing gears of the compound planetary system are preferably actuated by vacuum although they can equally as well be actuated by air pressure, hydraulic pressure or electrically.

Referring to the drawings for more specific details of the invention 10 represents generally a control system, Fig. 1, for a planetary gear system transmission 12, Figs. 5 through 9.

The control system 10 is supplied current from an electrical source of power, such as a battery 14 and includes a circuit 16 controlled as by an engine ignition switch 18.

The circuit 16 includes a pair of major current conductors 20 and 22, conductor 20 being controlled as by a make and break neutral switch 24 for the transmission and conductor 22 supplying current respectively by way of switches 26 and 27 to conductors 28 and 30.

Conductor 28 terminates in a contactor 31, which contactor upon engagement with a contactor 32 supplies current by way of conductor 33 to coil 34 of a solenoid 35, the armature 36 of which has a valve member 38 affixed at one end, movable in a valve housing 40 for controlling the passage of vacuum therethrough supplied from a source, not shown, to a vacuum cylinder 41 by way of conduit 42.

Conductor 30 terminates in a coil 44 of a solenoid 46, the armature 48 of which has affixed thereto a plurality of spaced switch elements 50, 52, and 54.

Conductor 28 terminates in contactor element 56 and has a branch conductor 58 connected thereto intermediate the switch 24 and contactor element 56. Branch conductor 58 is provided with a pair of spaced contactor elements 60 and 62 near its terminus and has a branch conductor 64 connected thereto intermediate its connection with conductor 20 and contactor elements 60 and 62.

A generator 66 is supplied current through brush 68 thereof by way of conductor 70 connected to the battery 14 through battery charger controls 72 controlled as by a switch element 74 of an armature 76 actuated switch 78. The switch 78 includes switch elements 80 and 82 in addition to switch element 74, and the armature 76 thereof forms part of a solenoid 84 including a coil 86.

The fields 88 of the generator are supplied current through a conductor 90 connected to the battery charge controls, controlled as by switch element 82 and are connected by way of a conductor 92, controlled as by switch element 82, to a contactor element 94 adapted to have engagement with contactor element 56.

A branch conductor 96 connected to conductor 92 intermediate contactor element 94 and switch element 82 control of conductor 92 terminates in a contactor element 98 spaced on an adjacent opposite side of contactor element 56 for engagement therewith.

Switch element 74 in addition to controlling the flow of current through conductor 70 controls the flow of current through conductor 100 terminating at one end in a contactor element 102 and at its other terminus in coil 86. A branch conductor 106 connected to conductor 100 intermediate contactor element 104 and switch element 74 control of conductor 100 has a coil 108 of a magnet 110 connected intermediate the length thereof and terminates in a contactor element 112.

Switch element 80 controls the flow of current in conductor 64 as does switch element 54 in its path of flow through conductor 64 between conductor 58 and coil 114 of electromagnetic clutch 116. In another position switch element 80 controls together with switch element 52 the flow of current through conductor 118 connected between conductor 70 and conductor 120.

A branch conductor 126 connected to conductor 100 intermediate switch element 74 and coil 86 terminates in a contactor element 128 adapted to be engageable with contactor element 60.

A branch conductor 130 connected to conductor 28 intermediate contactor 32 and switch 26 terminates in a contactor element 132 adapted to be engageable with contactor element 62.

A contactor element 134, adapted to be engageable with contactor element 112, is connected to one end of a conductor 136, the other end of which terminates in coil 138 forming part of a solenoid 140. The armature 142 of solenoid 140 includes a valve element 144 connected thereto and movable in a valve housing 146 for controlling the flow of vacuum therethrough.

The vacuum delivered through valve housing 146 operates by way of conduit 148 connected between housing 146 and a vacuum cylinder 150 to effect the actuation of diaphragm 152 against the resistance of spring 154, the purpose of which will hereinafter appear.

Conductor 120 as supplied current from conductor 118 supplies current to coil 156 of an electromagnetic clutch 158 by way of branch conductor 160 connected between conductor 120 and coil 156. Conductor 120 in addition to serving as a current supply line to coil 156 serves by way of branch conductor 162 connected therebetween with coil 114 and with branch conductor 164 controlled by switch element 50 to connect coil 114 with its ground. Switch element 50 also operates to control the conductor 166 connected between coil 156 and the ground therefor.

A contactor element 168 is connected at one end of a conductor 170 and the conductor terminates at its other end in a coil 172 with a switch 174 intermediate the ends of the conductor controlling the flow of current therethrough. The switch includes a pair of contactor elements 176 and 178 normally spaced apart and adapted to be brought into contacting engagement by the movement of a trip lever 180 affixed to a shiftable rod 182, said rod being attached to a diaphragm 184 of vacuum cylinder 41. A spring 186 in the cylinder normally biases the diaphragm and rod to a position causing engagement of switch 174.

The coil 172 forms part of a solenoid 190, the armature 192 of which is connected by linkage 194 to a rod 196 adapted to engage diaphragm 152 of cylinder 150 on one side thereof to resist the spring loading thereof, the purpose of which will hereinafter appear.

A speed governor 198 connected to a suitable take-off shaft of a vehicle in which the transmission controlled by control system 10 is incorporated includes a pivotal lever 200, one end 202 of which is engageable to move contactor elements 60, 62, 102 and 104 for the controlled engagement thereof with the respective other contactor elements they are adapted to be engageable with and adapted to engage a trigger 204, which trigger in turn controls contacting engagement between contactor elements 112 and 134.

An accelerator pedal 206 has a lever 208 attached thereto for movement therewith adapted to engage contactor element 98 and move it initially into engagement with contactor element 56 and subsequently upon further movement thereof to move the contactor elements 98 and 56 in unison for the engagement of contactor element 56 with contactor element 94.

Whereas a rod 209 connected to diaphragm 152 of cylinder 150 is linked to a lever mechanism 210, consisting of lever arms 212, 214 and 216 all connected to a common pivot shaft 218, rod 182 is pivotally connected to a lever 220 having oppositely disposed arms 222 and 224.

A link 226 having a pair of apertures 228 and 230 near the opposite extremities thereof receive respectively therein one end of lever arm 216 and a block 232, affixed at one end to a wrap around brake band 234. The lever arm 216 is notched at 236 near its free end so as to have the apex 238 of a tapered portion of the link 226 adjacent the aperture 228 have line contact bearing upon the lever arm 216 in the notch 236. The block 232 is notched 240 likewise as lever arm 216 so as to have the apex 242 of a tapered portion of the link 226 adjacent the aperture 230 have line bearing contact upon the block 232 in the notch 240.

A link 244 has one end pivotally mounted upon the free end of lever arm 214 and its other end 246 terminates in a taper received in a pocket 248 formed in a block 250, affixed at one end to a brake band 252.

Lever arm 222 has a roller 254 mounted on the extremity thereof adapted to be received in a cam member 256, pivoted upon a shaft 258, the purpose of which will hereinafter appear, and lever arm 224 has a shaft 260, affixed at its free end, which shaft 260 has in turn a short lever 262 affixed thereto axially spaced from lever arm 224. A link 264 having oppositely disposed tapered ends has one end 266 received in a notch 268 in arm 262 and its other end 270 received in a pocket 272 formed in a block 274, affixed at one end to a brake band 276.

The transmission 12 adapted to have its operation controlled by control system 10 includes primarily in addition to clutches 116 and 158 a compound planetary gear system 280 and brake drums 282, 284 and 286 associated with the clutches and planetary gear system and controlled respectively by the brake bands 252, 234 and 276.

Clutches 116 and 158 are preferably of the type more fully disclosed by co-pending application Ser. No. 195,379, consisting of input and output members coupled by the action of the respective electromagnetic coils 114 and 156 upon the energization thereof to drive the output members 288 and 290 respectively thereof from the engine of the vehicle to which they are applied.

The output member 288 of clutch 114 is affixed to a quill shaft 292, said shaft having on its axial extremity a sun gear 294 and intermediate its axial ends having the brake drum 282 affixed thereto. The output member 290 of clutch 158 is affixed to a shaft 296 telescopically received within quill shaft 292 and having at its one axial extremity a sun gear 298.

The planetary gear system is compound in nature in that it includes a plurality of planet cluster gear sets 300 and a plurality of planet cluster gear sets 302, sun gear 298 meshing with pinion gears 304 of gear sets 300, sun gear 294 meshing with pinion gears 306 of gear sets 302, a ring gear 308, integral with brake drum 286 meshing with pinion gears 304 of gear sets 300, and a ring gear 312, integral with brake drum 284, meshing with pinion gears 314 of gear sets 300. Pinion gears 304 in addition to meshing with sun gear 298 and ring gear 308 mesh with pinion gears 316 of gear sets 302.

The gear sets 300 and 302 are arranged in alternate circumferential relation and are supported for rotation upon respective planet carrier shafts 318 and 320, with the shafts 318 and 320 fixedly secured upon a planet carrier 322 forming a part of output shaft 324 for the transmission.

Whereas brake drum 282 is affixed to the shaft 292, the brake drums 284 and 286 are journalled for free rotation upon the respective shafts 292 and 324.

The brake bands 234, 252 and 276 are all appropriately anchored at their opposite ends from the actuated ends thereof thus permitting of the effective operation thereof into braking engagement upon the brake drums.

Contactor 31 is mounted on rod 209 for movement therewith and in addition to its being adapted to engage contactor 32 of conductor 33, it is adapted to engage a conductor 325 at the terminus of a conductor 327 having connection with conductor 136.

In a normal operation of the control system 10 for the purpose of effecting a controlled operation of the transmission 12 the ignition and neutral switches 18 and 24 respectively are closed.

During the period when the engine is idling such that the lever 200 engages the contactor elements as shown by Fig. 1 providing for the engagement of contactor elements 60 and 128, and 62 and 132, current flows through switch 18, switch 24, conductor 20 to contactor element 56 and also through branch conductor 58 connected to conductor 20, through engaged contactor elements 62 and 132 and branch conductor 130 connected between contactor elements 132 and conductor 28 and thence through conductor 28, contactor elements 31 and 32 and conductor 33 to coil 34 for the energization thereof. By virtue of the energization of coil 34 of solenoid 35 the armature 36 thereof and valve 38 attached to the armature are actuated permitting of the vacuum operation of diaphragm 184 of cylinder 41 against the resistance of spring 186 through the communication of the cylinder 41 by way of conduit 42 and valve housing 40 with a vacuum source, not shown, which could be the vacuum of the engine with which the transmission and controls therefor are incorporated. The actuation of the diaphragm results in the actuation of brake band 276 through the movement of lever 220 connected to rod 182, movable with the diaphragm, and link 264 arranged between lever 262 and block 274 affixed to brake band 276.

Current also flows through engaged contactor elements 60 and 128, branch conductor 126, and in one direction in conductor element 100 to coil 86 for the energization thereof and in the opposite direction through conductor 100 at its junction with branch conductor 126.

Upon the energization of coil 86 of solenoid 84, the armature 76 thereof and switch 78 connected thereto are actuated resulting in the movement of switch element 74 to close conductor 160 for the flow of current therethrough to contact terminal 102, movement of switch element 80 to close conductor 118 permitting of current flow between conductors 118 and 70 to the brushes 68 of the generator 66 and movement of switch element 82 to close conductor 92 for current flow from contactor element 98, through conductor 96, conductor 92 and conductor 90 to the fields of the generator.

As the accelerator pedal is initially depressed and with current flowing through the before defined conductors, contactor elements and coils, the contactor elements 56 and 98 are brought into contact resulting in the flow of current therethrough from the battery by way of conductor 20 for the operation of the generator. With the generator in operation, current is delivered therefrom by way of brushes 68, conductor 70, conductor 118 by way of closed switch elements 80 and 52, branch conductor 120, and branch conductor 160, for the energizing of the coil 156 and the resultant operation of clutch 158, by way of conductor 166, connecting the coil 156 to the ground through closed switch element 50.

During the time that the brake band 276 is actuated to retard the rotation of brake drum 276 and the clutch 158 is actuated, the clutch 116 remains idle and the rod 209 is maintained in a neutral position accounting for the inactivity of brake bands 252 and 234, by way of rod 196 resisting movement in one direction of diaphragm 152 and rod 209 connected thereto.

With the clutch 158 engaged and brake band 276 actuated to retard rotation of brake drum 286 and ring gear 308 integral therewith, rotation of output member 290 of the clutch is transmitted by way of shaft 296, to which it is connected, to sun gear 298 whereby in view of the braked relation of ring gear 308 and the intermeshing thereof and sun gear 298 with the planet gears 304, the planet gears are made to roll around the inside of the stationary ring gear and cause shafts 318, planet carrier 322 and output shaft 324 to rotate in a forward direction at a predetermined speed slower than shaft 296. This is referred to as low or first speed of operation of the transmission and is schematically shown in Fig. 5.

As the vehicle to which the transmission 12 and control system 10 are applied accelerates as a result of the first speed of operation of the transmission, said speed of the vehicle is imparted to gear 326, connected to the governor 198, driven from a suitable power output member of the vehicle such as the propeller shaft thereof. Upon rotation of the gear 326 and shaft 328 to which it is splined the arms 330 and 332 of the governor pivot as the weights 334 connected thereto are thrown centrifugally outward resulting in collar 336 connected to one end of arms 330 being moved axially relative to the shaft and the collar 338 fixed to the shaft upon which the arms 332 are pivoted. As the collar 336 moves axially on the shaft, lever 200 is pivoted about its axis, through the receipt of one end 340 thereof in a groove in collar 336, resulting in end 202 of the arm moving arcuately relatively vertically downward as viewed in Fig. 1 to thereby release contactor elements 62 and 132 from engagement with one another while permitting of the engagement of contactor elements 102 and 168. At this time contactor elements 60 and 128 are maintained in engagement through a proper structural makeup of the member which supports contactor elements 60 and 62.

Upon the release of contactor elements 62 and 132 from engagement with one another the current flow to solenoid 35 is disrupted resulting in the movement of the armature 36 to close off the vacuum source to the cylinder 41. As the vacuum is no longer operative on diaphragm 184, spring 186 moves the diaphragm 184, rod 182 and lever 180 effective to release brake band 276 from braking action upon brake drum 286 and the consequent release of the ring gear 308 from stationary position relative to planet pinion 304 with which it meshes. Lever 180 in its movement to the right as viewed in Fig. 1 moves contactor element 176 into engagement with contactor element 178.

With the contactor elements 176 and 178 in engagement, contactor elements 60 and 128 being maintained in engagement and contactor elements 102 and 168 having moved into engagement as a result of the movement of lever 200, current flows to coil 172 of solenoid 190 for the energization thereof by way of conductor 20, conductor 58, contactor elements 60 and 128, conductor 126, conductor 100, controlled as by closed switch element 74, contactor elements 102 and 168, and conductor 170 controlled as by contacts 176 and 178.

As a consequence of the energization of coil 172 of solenoid 190, the armature 192 and leverage mechanism 194 connected thereto is actuated resulting in movement of rod 196 to the right as viewed in Fig. 1 and permitting of the exertion of spring 154 acting upon diaphragm 152 to move diaphragm 152 and rod 209 connected thereto. Upon movement of rod 209, and the consequent movement of lever 212, lever 216, and link 226 connected in series thereto, the link 226 acts upon block 232 affixed to brake band 234 for the actuation thereof into braking engagement upon brake drum 284.

At the same time that brake band 276 is released, and brake band 234 is being engaged, the electromagnetic clutch 158 is maintained engaged as in the case of the first speed of operation of the transmission.

The actuation of the brake band 234 into braking engagement upon the brake drum 284 results in a braking of said drum and the ring gear 312 integral therewith. With the release of ring gear 308 in view of the release of brake band 276, the ring gear 308 together with drum 286 is free to rotate. By holding ring gear 312 stationary, the pinion gears 314 of gear set 300, wherein pinion gears 62 are rotated by the transmission of motion thereto from sun gear 294, rolls around inside of stationary ring gear 312 thus causing rotation of shafts 318, planet carrier 322 and output shaft 324 at a higher speed than when pinion gear 304 was rolling inside of stationary ring gear 308. This higher or second speed operation of the transmission as illustrated by Fig. 6 is attained because of the relative sizes of the pinion gears 304 and 314 to one another and the corresponding sizes of ring gears 308 and 312, as otherwise the planet gear sets 300 are the same ones being rotated in each instance for both first and second speeds.

Third speed of operation of the transmission is attained when as the vehicle accelerates to a higher speed the governor is operated at a higher speed resulting in further outward movement of the weights 334 of the governor and the axial upward movement of collar 336 to thereby move the lever 200 and its end 202 arcuately vertically downward. As the lever 200 is further moved from its position in second speed operation of the transmission it moves to a position to actuate contactor element 134 into engagement with contactor element 112.

Upon the actuation of contactor elements 134 and 112 into engagement, current is permitted to flow to coil 138 of solenoid 140 for the energization thereof by way of conductor 20, branch conductor 58, contactor elements 60 and 128, conductor 126, conductor 100, coil 108, contactor elements 112 and 134 and conductor 136. The energization of coil 138 results in the actuation of armature 142, of solenoid 140, and valve 144 connected thereto to allow for the passage of vacuum through valve housing 146, and conduit 148 for the actuation of diaphragm 152 in cylinder 150 against the resistance of spring 154. With the actuation of the diaphragm 152 by vacuum, the rod 209 connected thereto is moved to the left as viewed in Fig. 1 resulting in the actuation of brake band 252 by way of lever 212, lever 214, and link 244 engageable with block 250 affixed to brake band 252. The brake band 252 upon the actuation thereof operates to inhibit rotation of brake drum 282 and quill shaft 292 connected thereto. The movement of rod 209 to engage brake band 252 operates simultaneously to release brake band 234 from engagement and permit of the free rotation of brake drum 284.

At the same time that the brake band 252 is actuated and brake band 234 released, the circuit to the electromagnetic coil 156 of clutch 158 is maintained whereby the operation of the transmission in third speed as shown by Fig. 7 is attained.

The cessation of rotation of quill shaft 292 through the braking of drum 282 also provides for the holding of sun gear 294 stationary. The rotation of sun gear 298 as occurred in the first and second speeds of operation of the transmission continues whereby it operates to rotate planet gear sets 300 and which through the intermeshing relation of pinion gears 316 and pinion gears 304 of planet gear sets 300, the planet gear sets 302 are rotated. While because of the release of both brake bands 276 and 234 the planet gear sets 300 do not operate to transmit any motion to planet carrier 322 as was done in the first and second speeds of operation of the transmission, the rolling reaction of planet pinion gears 306 upon stationary sun gear 294 will provide for rotation of shafts 320, planet carrier 322 and output shaft 324 at a speed representing the third speed of operation of the transmission.

As the speed of the vehicle is further increased with the transmission in a third speed of operation, lever 200 is moved further arcuately downward under the influence of governor 198 until it permits of the disengagement of the contactor elements 60 and 128. The disengagement of contactor elements 60 and 128 disrupts the flow of current by way of conductors 126 and 100, coil 108 and contactor elements 112 and 134, to coil 138 of solenoid 140 thereby causing its de-energization, also the flow of current to coil 86 of solenoid 84 by way of conductor 126 and 100 in an opposite direction to thus de-energize the coil.

The de-energization of the coil 86 of solenoid 84 results in the switch 78 attached to armature 76 being moved with the armature to shift switch elements 74, 80 and 82 to close the respective circuits of conductors 70, 64 and 90 as shown by the drawing Fig. 1. As such current for the operation of coil 114 of clutch 116 flows from conductor 20, through conductor 58, and conductor 64 by way of switch elements 80 and 54 to the coil 114 for the energization thereof wherein coil 114 is arranged in series with coil 156 by way of conductors 162 and 160 for the grounding thereof thereby providing for the simultaneous operation of both clutches 116 and 158. Conductor 90 at this time by way of switch element 82 supplies current to the field coils 88 of the generator.

The de-energization of coil 138 of solenoid 140 results in the valve 144 attached to armature 142 being moved under the action of the armature to shut off the passage of vacuum through valve housing and conduit 148 connected to cylinder 150 such that the release of vacuum therefrom results in spring 154 moving the diaphragm to its neutral position as shown by Fig. 1 wherein the rod 196 limits its further movement to the right and whereby both brake bands 276 and 234 are released.

Through the movement of switch 78 the current flow circuit to coil 172 of armature 199 is disrupted such that the lever mechanism 194 and rod 196 are free to move under the spring loading therefor to the position shown in Fig. 1.

With both clutches 158 and 116 engaged and all of the brake bands released, the respective sun gears 298 and 294 connected to output members 290 and 288 by way of shafts 296 and 292 being operated at the same speed lock the planetary gear system together for the delivery of power at the output shaft 324 of a speed corresponding to the speed imparted to the clutch by the power plant or engine driving the vehicle in which the transmission is incorporated. This fourth or high speed operation of the transmission is illustrated by Fig. 8.

In a downstaging or reduction in speed operation of transmission 12 from fourth or high speed, the governor is rotated at a slower speed with the result that the lever 200 moves arcuately vertically upward from its furthest downward position accounting for the re-engagement of elements 60 and 128 and contactor elements 134 and 112. With the contactor elements 60 and 128 and 134 and 112 restored to engagement a third speed position of the component parts of the control system is re-established comparable to the accelerating upstaging of the transmission. It is at this time that solenoid 140 is energized for the vacuum shifting of brake band 252 into engagement, and coil 156 of clutch 158 is energized for its engagement to produce third speed of the transmission as illustrated by Fig. 7.

As end 202 of lever 200 engages contactor element 134 as to impinge it into engagement with contactor element 112 it completes the circuit through coil 108 of magnet 110 whereby the magnet maintains the contactor elements engaged even after the end 202 of lever has moved to an upward vertical position out of contact with contactor element 134 since the circuit to the magnet is not broken. At this time for the purpose of disengaging the contactor elements 134 and 112 as the lever 200 moves to a second speed position for the control system 10 and transmission 12, the end 202 thereof engages a trigger lever 204 which operates to engage contactor element 134 and disengage it from contactor element 112 thus breaking the current flow capacity thereof. Upon disruption of current flow through contactor elements 134 and 112, the solenoid 140 is de-energized resulting in release of vacuum from the cylinder 150 and the permissible movement of diaphragm 152 to shift the brake band 234 into engagement upon the brake drum. The spring 154 is free to move the diaphragm 152 because at this time the solenoid 190 is energized through contacts 102 and 168 and 176 and 178 being in engagement, effective to move the leverage mechanism 194 and rod 196 from blocking action upon diaphragm 152. Upon the movement of diaphragm 152 and rod 209 under the influence of spring 154 contactor 31 carried by the rod 209 is moved to a position to engage contactor 325. At this time no current is fed therethrough inasmuch as the current at this stage is not flowing in conductor 28.

With the continued engagement of the clutch 158 and the engagement of brake band 234 the second speed of operation of the transmission as illustrated by Fig. 6 is re-established.

As the lever 200 moves to a position corresponding to a low output speed of the vehicle in which the transmission is incorporated the contactor elements 102 and 168 become disengaged by action of the end 202 of lever 200 engaging contactor element 102 and operative to cause engagement of contactor elements 62 and 132. The disruption of current flow through contactor elements 102 and 168 results in the de-energization of solenoid 190 whereby through the exertion of spring means 342 acting on armature 172 the rod 196 is projected to the left. Upon the engagement of contactor elements 62 and 132 current flows therethrough to conductor 130, thence conductor 28, across engaged contactors 31 and 325 and conductors 327 and 136 for the energization of coil 138.

With the coil 138 energized, valve 144 is actuated providing for the vacuum controlled operation of diaphragm 152 effective to overcome spring 154 and move rod 209 connected thereto to the left as viewed in Fig. 1. The movement of the diaphragm is only of a sufficient amount under the influence of vacuum to permit of the movement of rod 198, under the influence of spring 342, to a position to block the movement of the diaphragm 152 to the right beyond a neutral position. This vacuum operation of the diaphragm is of a limited nature since immediately upon the vacuum movement of diaphragm 152 and the rod 209 connected thereto to the left contactor 31 is disengaged from the contactor 325 resulting in a cessation of current flow therethrough for coil 138. Consequently with the de-energization of coil 138 the vacuum operation of diaphragm 152 ends and the diaphragm assumes a neutral position.

With the diaphragm 152 and rod 209 in a neutral position contactor 31 engages contactor 32 and thus provides for current flow to coil 34 for the energization thereof effective to control the vacuum operation of diaphragm 184. Upon operation of diaphragm 184, rod 182 is shifted to the left thus affording an actuation of brake band 276 into engagement upon brake drum 286.

The engagement of clutch 158 continuing as in the second and third speeds of operation of the transmission and with the brake band 276 engaged, the transmission is re-established in first speed of operation.

As the transmission is de-accelerated back through the speeds from fourth to first the accelerator pedal 206 is normally depressed a sufficient amount to correspond with vehicle output speed but immediately upon the release thereof so that contactor elements 56 and 98 are no longer in engagement the vehicle will become idle and no driving action will be delivered through the transmission since the control system will assume a condition whereby the clutch 158 will be disengaged.

It is to be noted that the conductors 92 and 96 associated with the current input conductor 20 by way of contactor elements 94, 98 and 56 have resistances 344 and 346 respectively therein such that a varied current flow can be supplied to the generator 66 depending upon throttle position.

A reverse operation of the transmission is obtained through a simultaneous closing of switches 26, 27, normally open switch 347 connected across conductors 58 and 100 and an opening of a normally closed switch 349 arranged in conductor 136. The closing of switch 26 provides for the flow of current to coil 44 of solenoid 46 for the energization thereof, through conductor 22, switch 26 and conductor 30, with the lever 200 in the position of Fig. 1 and with the accelerator pedal depressed to cause engagement of contactor elements 98 and 56 such that by reason of the energization of coil 44, coil 114 of clutch 116 is energized for the engagement thereof while coil 156 of clutch 158 is de-energized for the disengagement thereof. A closing of switch 27 provides for the flow of current through conductor 22, switch 27, conductor 28, contactors 31 and 32, and conductor 33 to solenoid 34 for the energization thereof providing for the vacuum shifting of rod 182 toward the right as viewed in Fig. 1.

The cam 256 is adapted to be operated by a reverse selector lever 348 so as to function to receive the roller 254 connected to arm 222 of lever 220 therein to lock the brake band 276 against rotation of the drum 286 for either direction of rotation thereof through appropriate connection with the transmission manual shifting lever. With the cam 256 and roller 254 on arm 222 of lever 220 in the position shown by Fig. 4 the cam acts as an anchor for the brake band 276 in the braking application of the drum 286 when it is rotated reversely to the first speed operation of the transmission 12.

The energization of coil 114 and de-energization of coil 156 occurs as a result of the energization of coil 44 of solenoid 46 acting to actuate armature 48 of said solenoid and shift switch elements 50, 52 and 54 attached to the armature. Switch element 52 completes the circuit for supplying current to coil 114 whereas switch element 50 completes the ground therefor. At the same time the current flow of coil 156 is disrupted, current flows to coil 114 from the battery 14 by way of closed switches 18 and 24, conductor 20, closed contactor elements 56 and 98, conductor 96, and conductor 92 by way of closed switch element 82 to the field coils 88 of generator 66 for the operation thereof. Then as a result of the operation of the generator, current flows therefrom through conductor 70, conductor 118, closed switch element 80, conductor 119 by way of closed switch element 52, and conductor 64 to the coil 114 with the ground therefor by way of conductors 162, 120 and 164 and closed switch element 50.

The switch elements 80 and 82 in being positioned to close the circuits of conductors 118 and 92 respectively under the operative movement of armature 76 in view of the energization of coil 86 of solenoid 84 effect the flow of current to the respective coils 114 and 44 permitting of the controlled operation of clutch 116.

With solely clutch 116 and brake band 276 engaged, the rotation imparted to shaft 292 by output member 288 of the clutch causes a rotation of sun gear 294, the rotation of which is in turn transmitted to planet pinion gear 306 of gear sets 302 meshing with sun gear 294. The rotation of planet pinion gears 306 results in the rotation of planet pinion gear sets 302 such that the pinion gears 316 meshing with pinion gears 304 of planet pinion gear sets 300 cause the pinion gears 304 to roll reversely inside of ring gear 308 thus transmitting through the medium of shafts 318, and carrier 322 a reverse rotation to output shaft 324. This reverse operation of the transmission 12 is illustrated by Fig. 9.

If it is desired to rock the vehicle in which the transmission is incorporated, it is only necessary to alternately open and close switch 26 to thereby effect an alternate engagement of clutches 116 and 158 since with the brake band 276 applied and with the cam in the position shown by Fig. 4 a braking of the drum is effected regardless of the direction of rotation attempted to be transmitted thereto.

With switch 347 closed and switch 349 open the governor speed control is bypassed whereby for reverse and rocking operation of the transmission, the transmission is prevented from being shifted into a higher gear than low as established by way of the actuation of brake band 276 into engagement on drum 286.

Figs. 10 and 11 illustrate a form of manual control mechanism 350 that may be employed for obtaining a desired coordinated control of the transmission as pertains to the shifting to neutral, reverse, rocking and drive.

The control mechanism 350 is adapted to be suitably mounted upon a conventional steering post 352 of a vehicle employing the transmission and includes a fixed plate 354 upon which are suitably arranged contactor elements 24a, 26a, 27a, 349a and 347a constituting one terminal of each of the respective switches 24, 26, 27, 349 and 347 of the several circuits shown by the electrical network of Fig. 1. Contactor elements 24a, 26a and 27a are adapted to be engaged respectively by contactor elements 24b, 26b and 27b, representing another terminal of each of the switches 24, 26 and 27 respectively, arranged on a conductor arm 356. Likewise, contactor elements 349a and 347a are adapted to be respectively engaged by contactors elements 349b and 347b carried by respective conductor arms 358 and 360.

A pivotal plate 362 fixedly secured at one end to a journalled post 364 supports the conductor arms 356, 358 and 360 in insulated relation to one another, said plate and conductor arms being pivoted by a rotation of post 364 as effected by lever 366 connected thereto.

Through a pre-arrangement of the contactor elements 24a, 26a, 27a, 349a and 347a relative to one another and to the conductor arms 356, 358 and 360 and wherein the sets of contactor elements 24a and 24b are connected to conductors 28 and 16 respectively, contactor elements 26a and 26b are connected to conductors 30 and 16 respectively, contactor elements 27a and 27b are connected to conductors 28 and 16 respectively, contactor elements 349a and 349b are connected in conductor 136, and contactor elements 347a and 347b are connected to conductors 100 and 58 respectively movement of the plate 356 through a manual actuation of lever 366 causes the various switches 24, 26, 27, 349 and 347 to be actuated to provide for the desired flow of current in the electrical system and the corresponding desired drive condition of the transmission.

Plate 362 has a Bowden wire 368 connected thereto adapted to be connected at its other end to lever 348 so that a movement of the lever 366 to a selected shift position will effect a corresponding movement of wire 368 and lever 348 for either the engagement or disengagement of cam 256 upon roller 254.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. Control apparatus for a transmission having a driven shaft and a plurality of power actuated elements including a first electromagnetic clutch, a second electromagnetic clutch, a first brake, a second brake and a third brake, which transmission is driven by a prime mover having associated therewith an accelerator, a battery and an electric generator comprising an electrical network including said battery, a field coil of said generator, and a set of contacts adapted to be closed upon depression of the accelerator, said battery, coil and contacts being series-connected, power means for actuating the brakes, a first circuit including in series an armature of said generator and the coils of said first clutch for energizing said first clutch, a second circuit controlling the power means for actuating the third brake, a first switch responsive to the speed of the driven shaft to open the second circuit when said shaft speed exceeds a first pre-set value, a second switch responsive to the speed of the driven shaft to complete a third circuit controlling the power means for actuating the first brake when said shaft speed exceeds a first pre-set value thereof, a third switch responsive to the speed of the driven shaft to complete a fourth circuit controlling the power means for actuating the second brake when said shaft speed exceeds a second pre-set value thereof, a fourth switch responsive to the speed of the driven shaft to open the fourth circuit when the shaft exceeds a third pre-set value thereof and means for opening the first circuit and for establishing a fifth circuit for simultaneously energizing the coils of the first and second clutches controlled by the fourth switch when the speed of the driven shaft exceeds a third pre-set value thereof.

2. Control apparatus according to claim 1 wherein a governor driven from the driven shaft of the transmission controls the operation of the switches.

3. Control apparatus according to claim 1 wherein the means for opening the first circuit and for establishing a fifth circuit is a solenoid operated switch.

4. Control apparatus according to claim 1 wherein the power means for actuating the second and third brakes is vacuum, and wherein solenoids are connected in the second and third circuits for controlling the vacuum means.

5. Control apparatus according to claim 1 wherein a switch in the third circuit is controlled by the actuation of the power means for the third brake.

6. Control apparatus according to claim 1 wherein the power means for the second and third brakes is vacuum and the power means for the first brake is a spring load.

7. Control apparatus according to claim 6 wherein the power means for the first and second brakes is combined comprising a power cylinder including a diaphragm actuated in one direction by vacuum for operating the second brake and in the opposite direction by a spring for operating the first brake.

8. Control apparatus according to claim 1 wherein a solenoid connected in the third circuit controls the power means for the first brake.

9. Control apparatus according to claim 8 wherein lever means actuated by the solenoid resists the power means for the first brake.

10. Control apparatus according to claim 1 wherein switch means actuated by the power means for the first and second brakes controls the current flow in the second circuit and completes a sixth circuit between the second and fourth circuits.

11. Control apparatus according to claim 1 wherein a seventh circuit is provided connected between the first circuit and second clutch and wherein switch means are provided for controlling the first and seventh circuits for the alternate operation of the first and second clutches.

12. Control apparatus according to claim 11 wherein an eighth circuit connected to the battery includes a solenoid for controlling the switch means.

13. Control apparatus according to claim 12 wherein a manually actuated switch is connected in the eighth circuit for the control thereof.

14. Control apparatus according to claim 13 wherein a ninth circuit is provided connected between the battery and second circuit and wherein a switch controls the ninth circuit.

15. Control apparatus according to claim 3 wherein a solenoid for operating the solenoid operated switch is connected in a circuit connected to the fourth circuit and wherein the fourth switch controls the operation thereof.

16. Control apparatus according to claim 1 wherein the power means for actuating the second and third brakes is fluid.

17. Control apparatus for a transmission having a driven shaft and a plurality of power actuated elements including a first electromagnetic clutch, a second electromagnetic clutch, a first brake, a second brake and a third brake, which transmission is driven by a prime mover, power means for actuating the brakes, and an electrical network including a battery, a first circuit having the coils of the first clutch therein, a second circuit controlling the power means for actuating the third brake, a first switch responsive to the speed of the driven shaft to open the second circuit when said shaft speed exceeds a first pre-set value, a second switch responsive to the speed of the driven shaft to complete a third circuit controlling the power means for actuating the first brake when said shaft exceeds a first pre-set value thereof, a third switch responsive to the speed of the driven shaft to complete a fourth circuit controlling the power means for actuating the second brake when said shaft speed exceeds a second pre-set value thereof, a fourth switch responsive to the speed of the driven shaft to open the fourth circuit when the shaft exceeds a third pre-set value thereof, and means for opening the first circuit and for establishing a fifth circuit for simultaneously energizing the coils of the first and second clutches controlled by the fourth switch when the speed of the driven shaft exceeds a third pre-set value thereof.

MARTIN P. WINTHER.
ANTHONY WINTHER.
ANDREW S. GILL, Jr.

References Cited in the file of this patent
UNITED STATES PATENTS

| Number | Name | Date |
| --- | --- | --- |
| 2,540,639 | Winther et al. | Feb. 6, 1951 |